United States Patent
Moore et al.

(10) Patent No.: US 6,817,961 B2
(45) Date of Patent: Nov. 16, 2004

(54) MAGNETICALLY RESPONSIVE LIMITED SLIP DIFFERENTIAL

(75) Inventors: Jason E. Moore, Clarkston, MI (US); Frederick E. Zink, Capac, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 0 days.

(21) Appl. No.: 10/358,704

(22) Filed: Feb. 5, 2003

(65) Prior Publication Data

US 2004/0152553 A1 Aug. 5, 2004

(51) Int. Cl.[7] ............................................. F16H 48/26
(52) U.S. Cl. ........................ 475/85; 475/231; 475/150
(58) Field of Search .......................... 475/85, 231, 150

(56) References Cited

U.S. PATENT DOCUMENTS

| | | | |
|---|---|---|---|
| 4,444,298 A | 4/1984 | Stangroom | |
| 4,896,754 A | 1/1990 | Carlson et al. | |
| 5,007,513 A | 4/1991 | Carlson | |
| 5,147,252 A | 9/1992 | Mace et al. | |
| 5,158,507 A * | 10/1992 | Guimbretiere | 475/231 |
| 5,322,484 A | 6/1994 | Reuter | |
| 5,358,084 A | 10/1994 | Schramm | |
| 5,730,531 A | 3/1998 | Pinkos et al. | |
| 5,779,013 A | 7/1998 | Bansbach | |
| 5,845,753 A | 12/1998 | Bansbach | |
| 5,915,513 A | 6/1999 | Isley, Jr. et al. | |
| 6,183,386 B1 | 2/2001 | Duggan | |
| 6,334,832 B1 | 1/2002 | Heravi et al. | |
| 6,428,441 B1 * | 8/2002 | Hunt | 475/231 |
| 6,454,674 B1 * | 9/2002 | Krzesicki et al. | 475/85 |
| 6,527,661 B2 * | 3/2003 | Leeper | 475/150 |
| 6,585,616 B1 * | 7/2003 | Robinson | 475/85 |

* cited by examiner

Primary Examiner—Rodney H. Bonck
Assistant Examiner—Dennis J. Abdelnour
(74) Attorney, Agent, or Firm—Harness, Dickey & Pierce P.L.C.

(57) ABSTRACT

A differential system includes a case, a pair of pinion gears, a pair of side gears and an electrically operable coupling including a magnetically responsive fluid. The coupling selectively drivingly interconnects one of the side gears and the case. In one instance, the present invention includes a rotor having a plurality of outwardly extending blades positioned in communication with a magneto-rheological fluid. An electromagnet is selectively actuated to change the viscosity of the magneto-rheological fluid. In this manner, the differential may function as an "open" differential, a "locked" differential or a differential accommodating a limited-slip condition.

19 Claims, 6 Drawing Sheets

MAGNETICALLY RESPONSIVE LIMITED SLIP DIFFERENTIAL

BACKGROUND OF THE INVENTION

The present invention generally relates to differentials for motor vehicles and, more particularly, to a limited slip differential employing a magneto-rheological fluid to control operation of the differential.

As is known, many motor vehicles are equipped with driveline systems including differentials which function to drivingly interconnect an input shaft and a pair of output shafts. The differential functions to transmit drive torque to the output shafts while permitting speed differentiation between the output shafts.

Conventional differentials, such as a parallel-axis helical differential, include a pair of side gears fixed for rotation with the output shafts and two or more sets of meshed pinion gears mounted within a differential case. However, the conventional differential mechanism has a deficiency when a vehicle is operated on a slippery surface. When one wheel of the vehicle is on a surface having a low coefficient of friction, most or all of the torque will be delivered to the slipping wheel. As a result, the vehicle often becomes immobilized. To overcome this problem, it is known to provide a mechanical differential where an additional mechanism limits or selectively prevents differentiation of the speed between the output shafts. Typically, the mechanical device to provide the limited-slip or non-slip function is a friction clutch. The friction clutch is a passive device which limits the differential speed between the output shafts only after a certain differential speed has been met. Additionally, such mechanical devices may not be selectively disengaged during operation of anti-lock braking systems or vehicle traction control systems. For example, four wheel anti-lock braking systems attempt to measure and control the rotational speed of each wheel independently. If a mechanical type limited slip differential is present, independent control of the speed of each wheel coupled to a differential is no longer possible. Accordingly, it would be desirable to provide an improved differential which may be actively controlled in conjunction with other control systems present on the vehicle.

SUMMARY OF THE INVENTION

The present invention relates to a differential system including a case, a pair of pinion gears, a pair of side gears and an electrically operable coupling including a magnetically responsive fluid. The coupling selectively drivingly interconnects one of the side gears and the case. In one instance, the present invention includes a rotor having a plurality of outwardly extending blades positioned in communication with a magneto-rheological fluid. An electromagnet is selectively actuated to change the viscosity of the magneto-rheological fluid. In this manner, the differential may function as an "open" differential, a "locked" differential or a differential accommodating a limited slip condition.

Another aspect of the present invention includes a differential system having an electronic controller wired in communication with the magneto-rheological coupling. The electronic controller is supplied with data from many vehicle sensors and systems such as an anti-lock braking system, a vehicle traction control system, or a cruise control system. The electronic controller may be programmed to actuate the magneto-rheological coupling based on calculations performed by the electronic controller or any number of inputs such as those received from vehicle sensors such as those detecting wheel speed, gear position, vehicle speed, transfer case range position, application of one or more brakes, among others.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The present invention is directed to an improved differential for a drivetrain of a motor vehicle. The differential of the present invention includes a rotor in communication with a magneto-rheological fluid to selectively limit the speed differentiation between two output shafts of a drive axle. It should be appreciated that the differential of the present invention may be utilized with a wide variety of driveline components and is not intended to be specifically limited to the particular application described herein.

Figure 1:
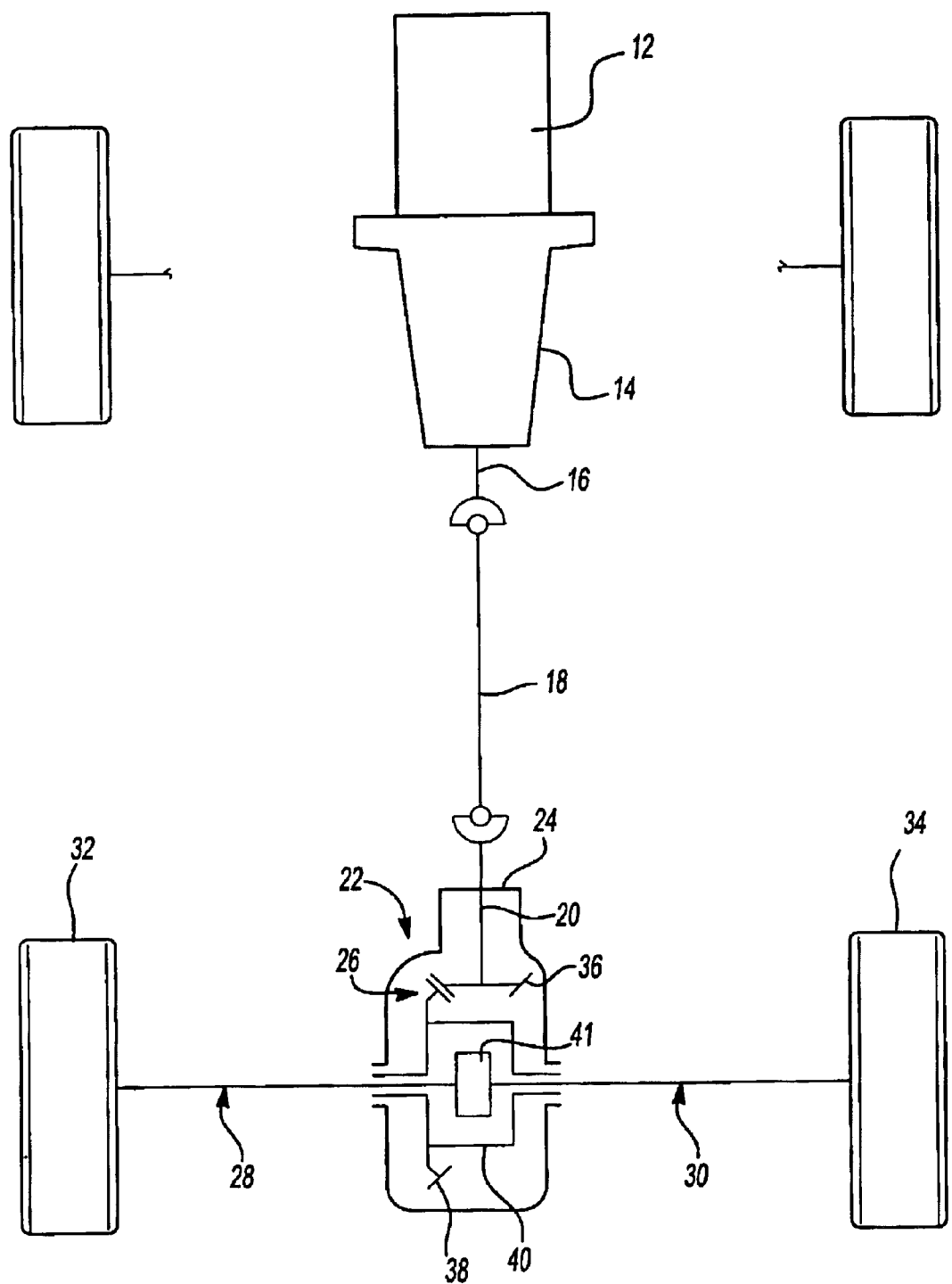
FIG. 1 is a schematic view of an exemplary motor vehicle drivetrain including a differential assembly of the present invention.

With reference to FIG. 1, a drivetrain 10 for an exemplary motor vehicle is shown to include an engine 12, a transmission 14, having an output shaft 16 and a propeller shaft 18 connecting output shaft 16 to a pinion shaft 20 of a rear axle assembly 22. Rear axle assembly 22 includes an axle housing 24, a differential assembly 26 supported in axle housing 24 and a pair of axle shafts 28 and 30 respectively interconnected to left and right and rear wheels 32 and 34. Pinion shaft 20 has a pinion gear 36 fixed thereto which drives a ring gear 38 that is fixed to a differential case 40 of differential assembly 26. A gear set 41 supported within differential case 40 transfers rotary power from differential case 40 to axle shafts 28 and 30, and facilitates relative rotation (i.e., differentiation) therebetween. Thus, rotary power from engine 12 is transmitted to axle shafts 28 and 30 for driving rear wheels 32 and 34 via transmission 14, propeller shaft 18, pinion shaft 20, differential case 40 and gear set 41. While differential assembly 26 is depicted in a rear-wheel drive application, the present invention is contemplated for use in differential assemblies installed in trailing axles, transaxles for use in front-wheel drive vehicles, transfer cases for use in four-wheel drive vehicles and/or any other known vehicular driveline application.

Figure 2:
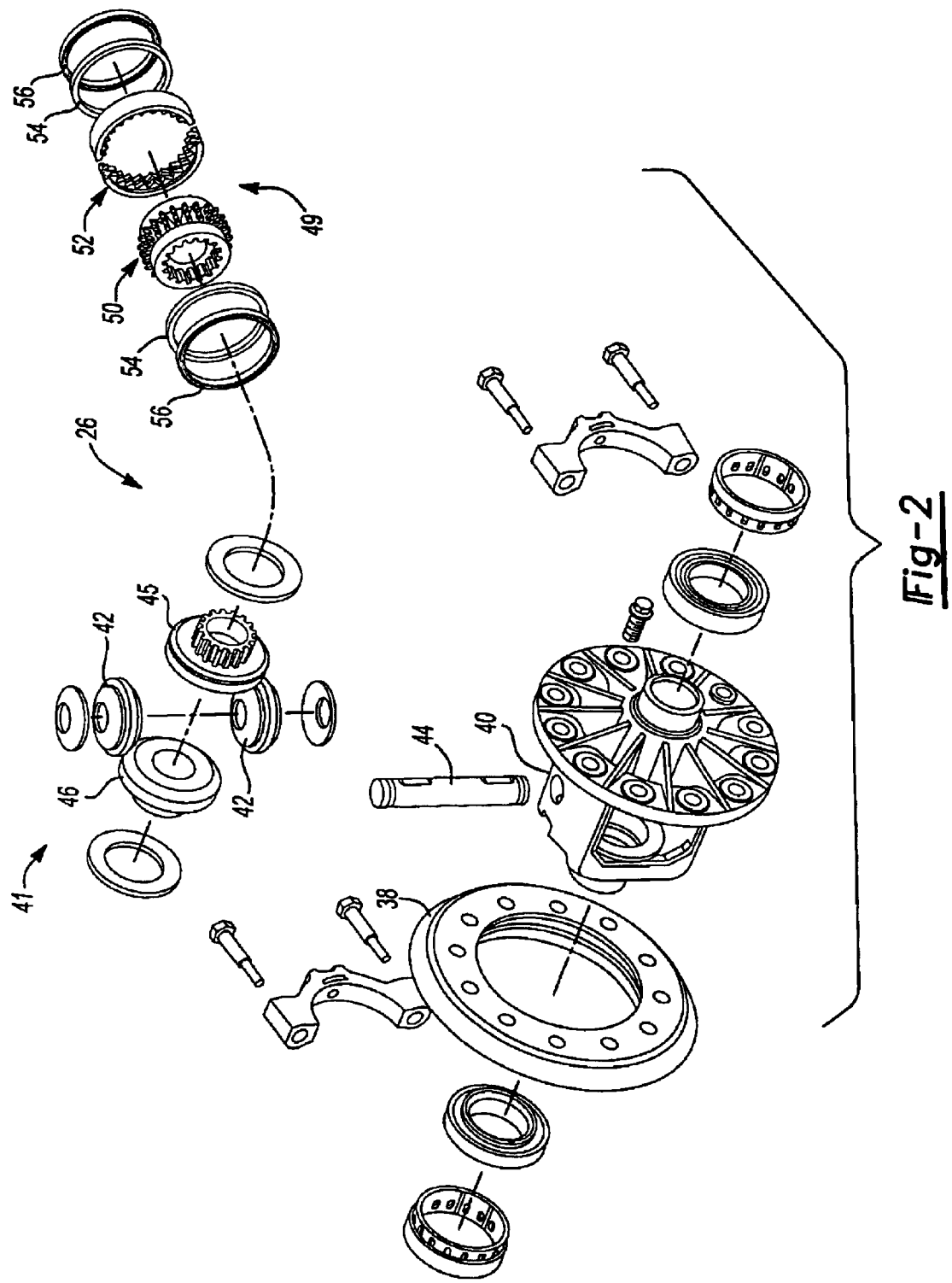
FIG. 2 is an exploded perspective view of the differential assembly of the present invention.

FIG. 2 depicts differential assembly 26 including differential case 40 and gear set 41. Gear set 41 includes a pair of pinion gears 42 rotatably supported on a cross shaft 44. First and second side gears 45 and 46 are drivingly interconnected to pinion gears 42 and axle shafts 28 and 30. Differential assembly 26 also includes a magneto-rheological coupling 49 having a rotor 50, an electromagnet 52, seals 54 and bearings 56. A magneto-rheological fluid 57 (FIG. 7) is captured between seals 54 and is in contact with rotor 50.

Figure 3:
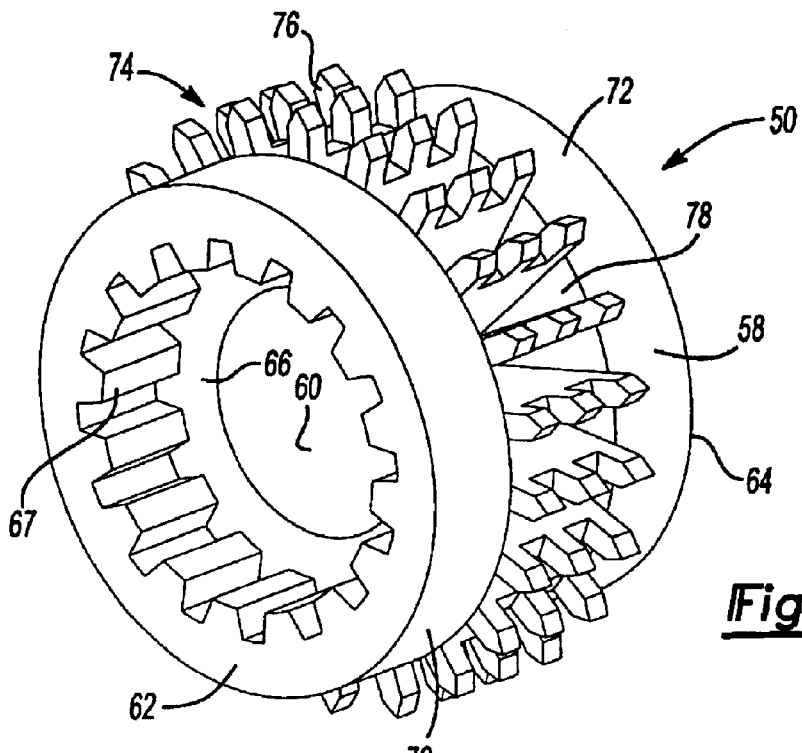
FIG. 3 is a perspective view of a rotor of the differential of the present invention.

With reference to FIG. 3, rotor 50 includes a generally cylindrically shaped body 58 having a bore 60 extending from a first end face 62 to a second end face 64. A counter bore 66 inwardly extends from first end face 62. Counter bore 66 includes an internal spline 67 and is sized for receipt of a trunnion portion 68 of first side gear 45. Rotor 50 may be coupled to first side gear 45 via one of any number of interconnection methods such as a straight spline, a press fit, a taper lock fit or any other suitable method for interconnecting torsion members. Rotor 50 also includes a first outer cylindrical surface 70 and a second outer cylindrical surface 72 positioned on either side of a turbine section 74. Turbine section 74 includes a plurality of blades 76 extending radially outwardly from body 58. A portion of each blade 76 extends beyond first and second outer cylindrical surfaces 70 and 72. Pockets 78 are defined between each blade 76. As will be described in greater detail hereinafter, pockets 78 are useful for storing magneto-rheological fluid 57.

Figure 4:
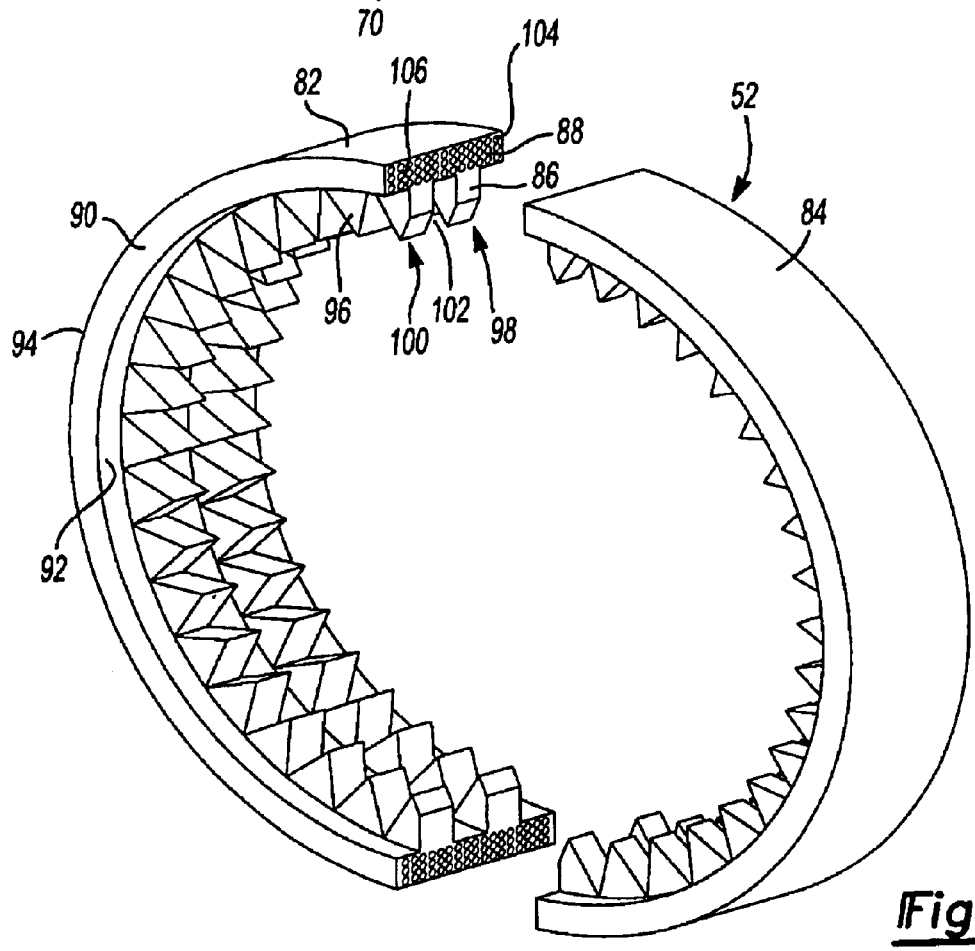
FIG. 4 is a perspective view of a first embodiment electro-magnet for use in the differential of the present invention.

With reference to FIG. 4, a first embodiment electromagnet 52 includes a first half 82 and a second half 84. First half 82 includes a core 86 and a coil 88 wound about core 86. Core 86 includes a substantially cylindrical wall 90 having an inner surface 92 and an outer surface 94. A plurality of teeth 96 extend radially inwardly from inner surface 92. Teeth 96 are arranged in a first row 98 and a second row 100. First row 98 is spaced apart from second row 100 to define an annular gap 102. Coil 88 consists of a single wire having a first end 104 and a second end 106. As is known in the art, a magnetic field is generated when current is passed through coil 88. It should be appreciated that the intensity of the magnetic field varies as a function of the current passing through coil 88. Second half 84 is substantially a mirror image of first half 82 and therefore will not be described in greater detail.

Figure 5:
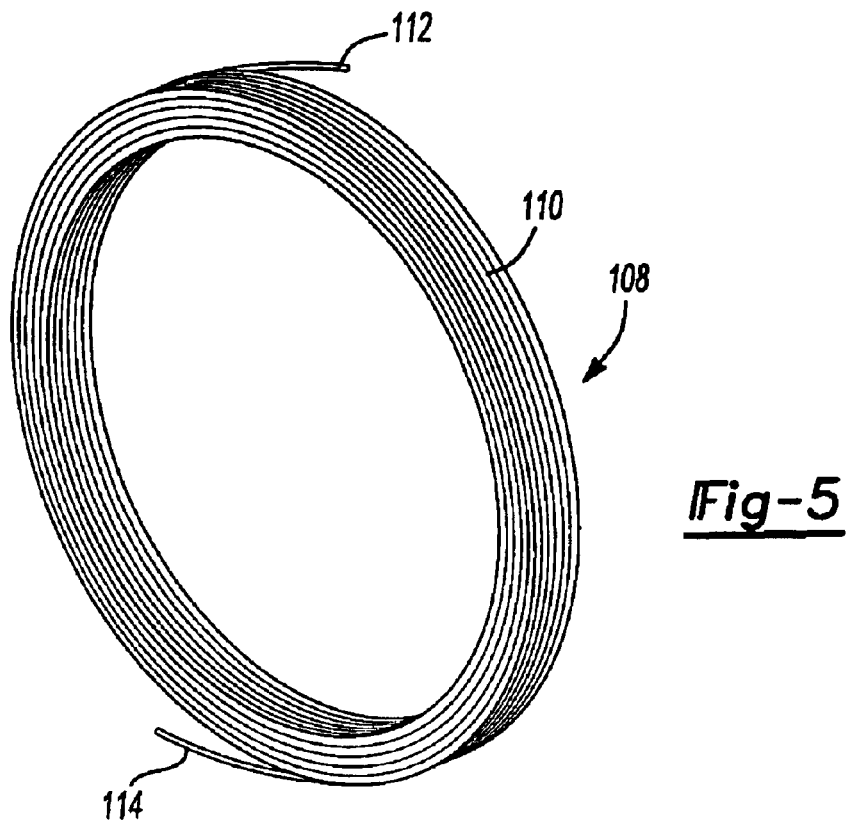
FIG. 5 is a perspective view of a second embodiment electromagnet for use in the differential of the present invention.
Figure 6:
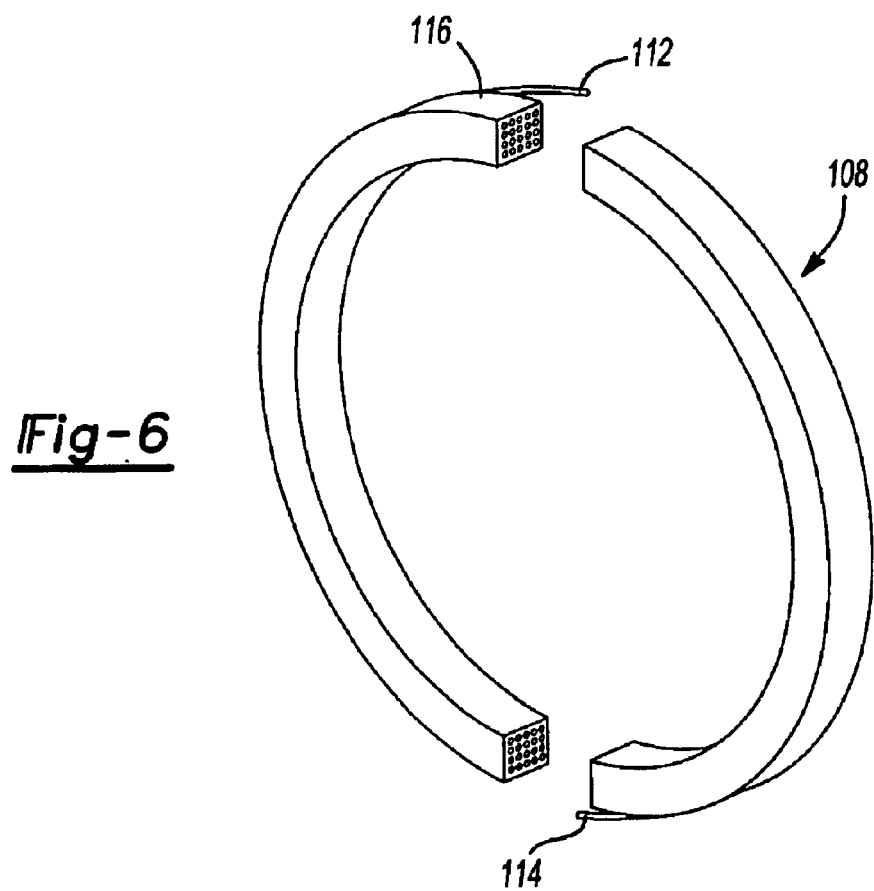
FIG. 6 is a fragmentary perspective view of the electro-magnet of FIG. 5 including a cage of the present invention.

FIG. 5 depicts a second embodiment electromagnet 108 including a substantially cylindrically shaped coil 110 having a first end 112 and a second end 114. As shown in FIG. 6, electromagnet 108 may include an optional cage 116 to assist in positioning cylindrical coil 110 within differential case 40. Moreover, it should be appreciated that electromagnet 108 need only include a single closed loop of wire to produce a magnetic field. Accordingly, coil 110 may be formed in any number of shaped or sizes without departing from the scope of the present invention.

Figure 7:
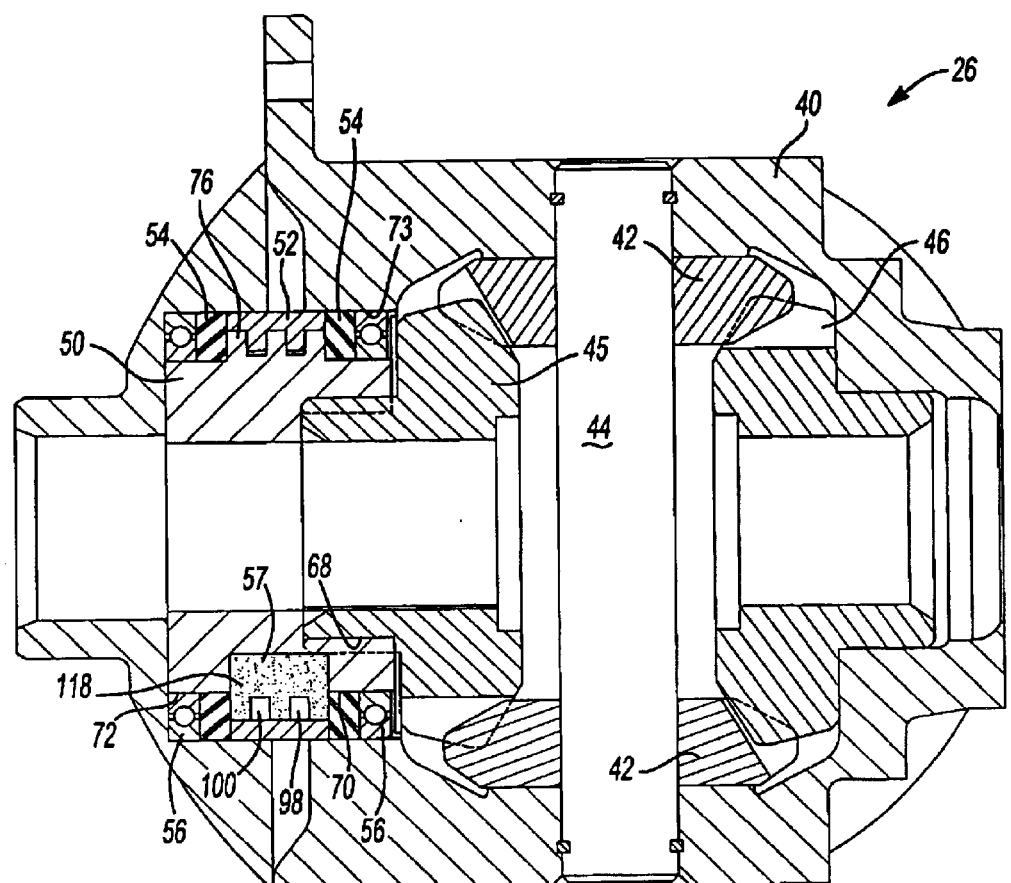
FIG. 7 is a sectional view taken through the differential of the present invention.
Figure 9:
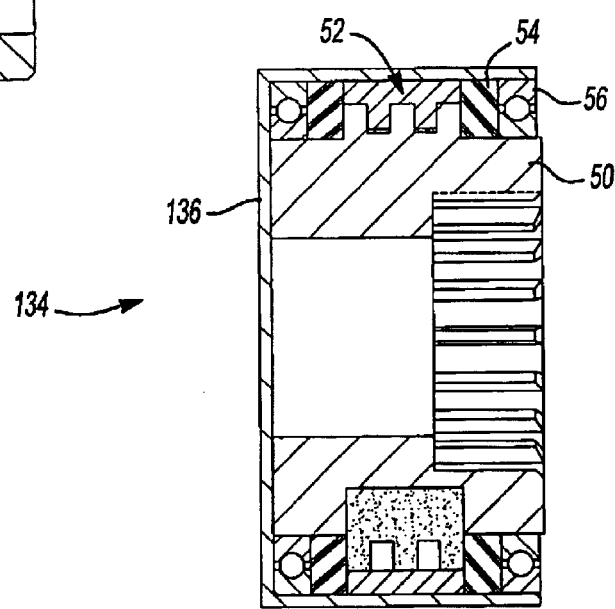
FIG. 9 is a sectional view of a modular pack magneto-rheological coupling of the present invention.

Concerning FIG. 7, bearings 56 are in contact with first and second outer cylindrical surfaces 70 and 72 to rotatably support rotor 50 and first side gear 45 within a bore 73 of differential case 40. Seals 54 are positioned adjacent bearings 56 to define a chamber 118. Electromagnet 52 is positioned within chamber 118 such that first row of teeth 98 and second row of teeth 100 are positioned within the spaces between blades 76 of rotor 50. Magneto-rheological fluid 57 fills the remainder of chamber 118 including the spaces between teeth 96 and blades 76, as well as pockets 78 of rotor 50.

Magneto-rheological fluid 57 is a controllable fluid in which the viscosity of the fluid may be changed from a freely flowing liquid to a semi-solid when the fluid is exposed to a magnetic field. One known fluid is manufactured by Lord Corporation sold under the trade name Rheonetic. When the magnetic field is removed, the magneto-rheological fluid returns to its original free-flowing liquid state. Advantageously, the response time for magneto-rheological fluid 57 to change between a steady-state semi-solid phase to a steady-state fluid phase is approximately one millisecond. Accordingly, an active limited slip differential having quick torque response characteristics may be provided.

During operation, blades 76 of rotor 50 pass through magneto-rheological fluid 57 positioned within chamber 118. When no current is flowing through coil 88, no magnetic field is generated by electromagnet 52. At this time, the force required for blades 76 to shear magneto-rheological fluid 57 during rotation is relatively low. Accordingly, differential assembly 26 acts as an "open" differential with little to no limited-slip function. If a torque distribution or limited-slip function is desirable between rear wheels 32 and 34, an electrical current is applied to coil 88 to cause electromagnet 52 to generate a magnetic field. Application of the magnetic field causes magnetically polarized particles within magneto-rheological fluid 57 to align themselves within the magnetic field. Various levels of viscosity may be obtained by varying the intensity of the magnetic field applied to the magneto-rheological fluid.

As the viscosity of the magneto-rheological fluid is increased, the resistance to blades 76 passing through chamber 118 increases, effectively forming a coupling between differential case 40 and first side gear 45. By selectively increasing the resistance to rotation of blades 76, an active limited-slip differential is formed. If either wheel 32 or 34 were to encounter a low coefficient of friction surface, torque would be distributed from the slipping wheel to the driving wheel by simply supplying current to coil 88. The magnitude of the torque provided to the driving wheel is equal to the torque required to rotate blades 76 through magneto-rheological fluid 57.

Figure 8:
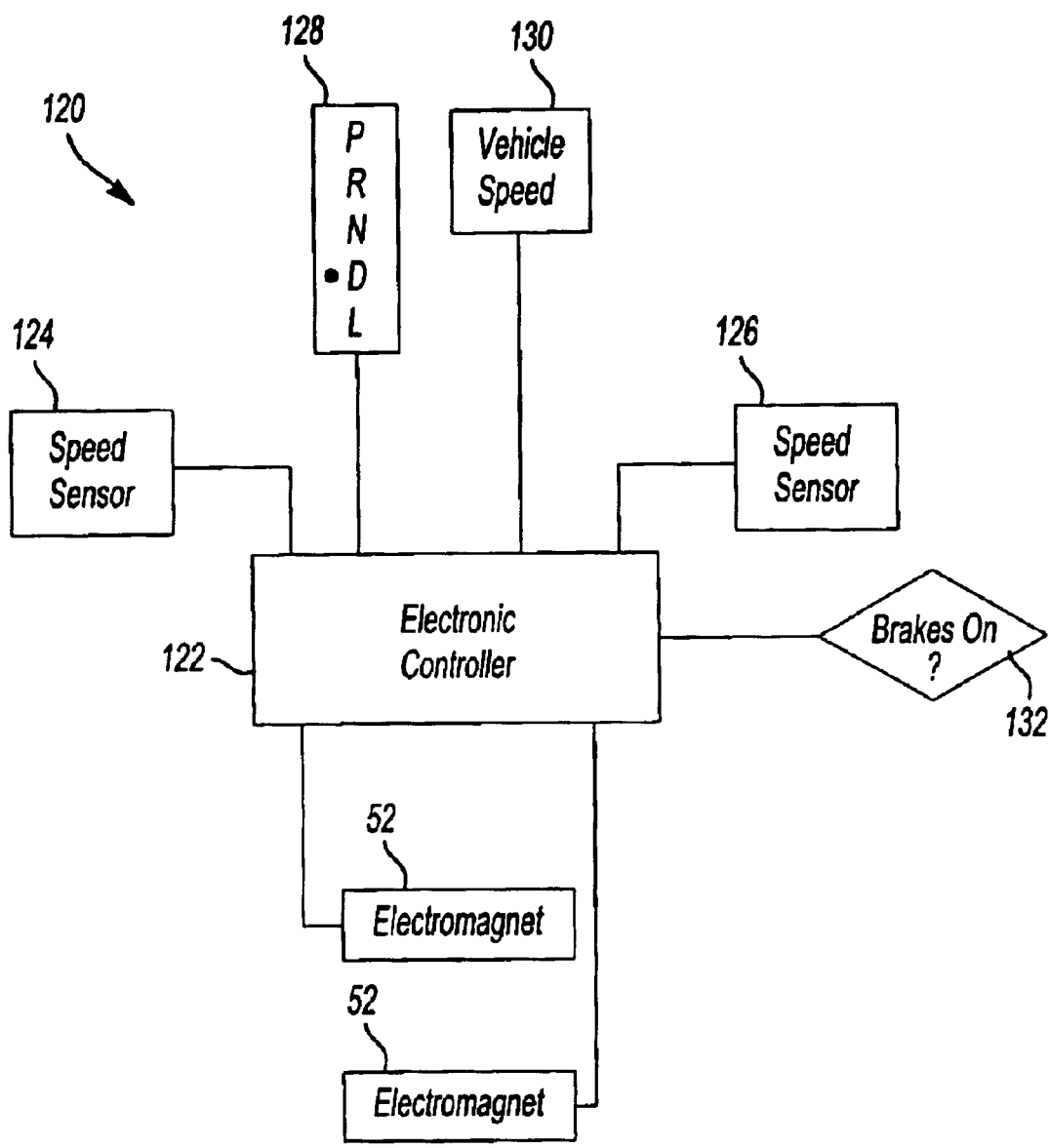
FIG. 8 is a schematic diagram of an electronic control system for use with the differential illustrated in FIGS. 1 and 2.

Referring now to FIG. 8, an exemplary electronic control system is generally indicated at reference numeral 120. Electronic control system 120 controls the operation of electromagnet 52 and, therefore the operation of differential assembly 26. Electronic control system 120 includes an electronic controller 122, electromagnet 52, a first speed sensor 124, and a second speed sensor 126. First speed sensor 124 collects data corresponding to the rotational speed of axle shaft 28. First speed sensor 124 is in communication with controller 122. Similarly, second speed sensor 126 measures the rotational speed of axle shaft 30 and outputs a signal to electronic controller 122 indicative thereof. Electronic controller 122 is configured in communication with electromagnet 52 such that electronic controller 122 may selectively direct current through coil 88 to produce a magnetic field. Depending on the data collected at any number of vehicle sensors such as a gear position sensor 128, a vehicle speed sensor 130, a transfer case range position sensor, or a brake sensor 132, the magnitude of current passed through coil 88 will be defined by electronic controller 122. Electronic controller 122 collects information regarding vehicle parameters such as vehicle speed, or may calculate parameters such as the magnitude of the differential speed between axle shafts 28 and 30. Electronic controller 122 compares the measured or calculated parameters to a predetermined value and outputs an electrical signal to create the desired strength magnetic field in electromagnet 52. Conditions ranging from a near "open" differential to a "locked" differential may be obtained. For example, when operating in conjunction with a four-wheel anti-lock braking system, electronic controller 122 will maintain differential assembly 26 in an "open" condition by not sending current to electromagnet 52 if a brake is being applied. Limiting axle differentiation at this time would counteract the anti-lock braking system. Other such situations may be programmed within electronic controller 122.

An alternate embodiment differential assembly may be constructed using a pre-assembled modular pack 134. Modular pack 134 includes a cup 136 preferably constructed from relatively thin stamped steel. Cup 136 houses seals 54, bearings 56, rotor 50, magneto-rheological fluid 57 and electromagnet 52 within a sealed module. Modular pack 134 may be assembled separately and prior to manufacture of differential assembly 26. Modular pack 134 may optionally include first side gear 45. During manufacture of differential assembly 26, modular pack 134 may be installed without requiring any special handling procedures for the magnetorheological fluid.

While a rear drive axle assembly has been described in detail, it should be appreciated that the differential system of the present invention is not limited to such an application. Specifically, the differential system of the present invention may be used in transaxles for front-wheel drive vehicles, transfer cases for use in four-drive vehicles and/or a number of other vehicular driveline applications.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A differential system comprising:
   a case defining an interior cavity, said case having a bore communicating with said interior cavity;
   a pair of pinion gears positioned within said interior cavity and rotatably coupled to said case;
   first and second side gears positioned within said interior cavity in meshing engagement with said pinion gears and rotatably coupled to said case;
   a rotor rotatably supported in said bore and coupled to said first side gear, said rotor including a plurality of blades extending outwardly therefrom;
   a selectively actuatable electromagnet coupled to said case, said electromagnet being positioned between axial ends of said rotor;
   a magnetically responsive fluid having a viscosity which varies in response to the presence of a magnetic field, said fluid positioned in communication with said blades and fluid providing a selectable resistance to rotation of said blades.

2. The differential system of claim 1 wherein said electromagnet is positioned within said bore adjacent said rotor.

3. The differential system of claim 2 wherein said rotor includes a plurality of offset rows of blades and wherein said electromagnet includes at least one row of teeth positioned between two of said rows of blades.

4. The differential system of claim 3 further including a seal defining a chamber for containing said magnetically responsive fluid within said case.

5. The differential system of claim 4 further including a bearing positioned outside of said chamber and rotatably supporting said rotor within said case.

6. The differential system of claim 5 wherein said pinion gears rotate about a first common axis and wherein said first and second side gears rotate about a second common axis, said first common axis being positioned substantially orthogonal to said second common axis.

7. The differential system of claim 6 further including a first shaft drivingly coupled to said first side gear and a second shaft drivingly coupled to said second side gear.

8. A differential system comprising:
   a case defining an interior cavity, said case having a bore communicating with said interior cavity;
   a pair of pinion gears positioned within said interior cavity and rotatably coupled to said case;
   first and second side gears positioned within said interior cavity in meshing engagement with said pinion gears and rotatably coupled to said case; and
   an electrically operable coupling selectively drivingly interconnecting said first side gear and said case, said electrically operable coupling being separable from said differential system as a unit and including:
      a housing coupled to said case for rotation therewith;
      a rotor rotatably supported in said housing and coupled to said first side gear, said rotor including a plurality of blades extending outwardly therefrom;
      a selectively actuatable electromagnet coupled to said housing; and
      a magnetically responsive fluid having a viscosity which varies in response to the presence of a magnetic field, said fluid being positioned in communication with said blades to provide a selectable resistance to rotation of said blades.

9. The differential system of claim 8 wherein said housing is shaped as a thin walled cup having a substantially cylindrical wall with an outer surface engaging a wall of said bore in said case.

10. The differential system of claim 9 wherein said electrically operable coupling includes a bearing positioned within said housing rotatably supporting said rotor.

11. The differential system of claim 10 further including a seal engaging an inner surface of said housing and an outer surface of said rotor to retain said magnetically responsive fluid within said housing.

12. The differential system of claim 11 further including an electronic controller in communication with said electrically operable coupling to selectively operate said coupling in response to a vehicle signal.

13. The differential system of claim 12 wherein said vehicle signal is one of the group consisting of a wheel speed, a differential in wheel speed, a transfer case range position, a gear position, a vehicle speed, a brake application or a change in wheel speed.

14. The differential system of claim 13 wherein said electromagnet is in communication with said electronic controller.

15. A differential system comprising:
   a case defining an interior cavity, said case having a bore communicating with said interior cavity;
   a pair of pinion gears positioned within said interior cavity and rotatably coupled to said case;

first and second side gears positioned within said interior cavity in meshing engagement with said pinion gears and rotatably coupled to said case;

a rotor rotatably supported in said bore and coupled to said first side gear, said rotor including a plurality of offset rows of blades extending outwardly therefrom;

a selectively actuatable electromagnet coupled to said case, said electromagnet including at least one row of teeth positioned between two of said rows of blades;

a magnetically responsive fluid having a viscosity which varies in response to the presence of a magnetic field, said fluid positioned in communication with said blades and fluid providing a selectable resistance to rotation of said blades.

16. The differential system of claim 15 further including a seal defining a chamber for containing said magnetically responsive fluid within said case.

17. The differential system of claim 16 further including a bearing positioned outside of said chamber and rotatably supporting said rotor within said case.

18. The differential system of claim 17 wherein said pinion gears rotate about a first common axis and wherein said first and second side gears rotate about a second common axis, said first common axis being positioned substantially orthogonal to said second common axis.

19. The differential system of claim 18 further including a first shaft drivingly coupled to said first side gear and a second shaft drivingly coupled to said second side gear.

* * * * *